March 1, 1927.  E. HAINES  1,619,573

LID SUPPORT

Filed May 25, 1926

Inventor

E. Haines

By Lacey & Lacey, Attorneys

Patented Mar. 1, 1927.

1,619,573

UNITED STATES PATENT OFFICE.

ELIZABETH HAINES, OF CONCORD, MASSACHUSETTS.

LID SUPPORT.

Application filed May 25, 1926. Serial No. 111,577.

Cooking utensils in which articles of food are boiled, when tightly covered and the contents are in a state of ebullition, bubble over because there is no provision for escape of the steam generated.

The present invention provides means for supporting the cover or lid in elevated position so that the steam may escape and thereby prevent the contents of the pot or other utensil from boiling over.

The invention provides an attachment which may be used in connection with different utensils and which is readily adjustable to support the lid at different elevations and which will prevent displacement of the lid in any adjusted position.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which—

Figure 1:
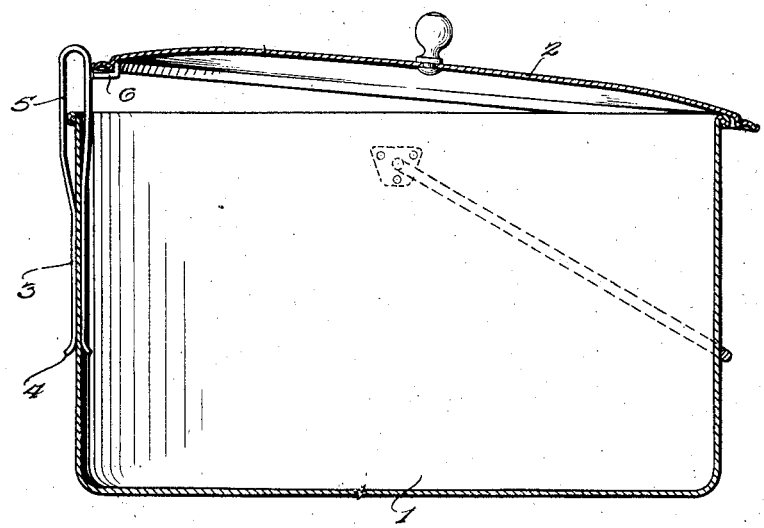
Figure 2:
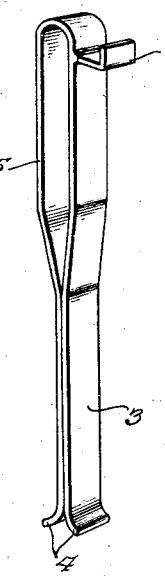

Figure 1 is a sectional view of a cooking utensil and cover, illustrating an embodiment of the invention, and Figure 2 is a perspective view of the lid support.

Corresponding and like parts are referred to in the following description and designated in both views of the drawings by like reference characters.

The numeral 1 designates a pot or utensil such as commonly employed in the preparation of food and 2 indicates the usual lid or cover for closing the same.

The support for the lid or cover partakes of the nature of a clip, the jaws being of an appreciable extent to obtain a firm grip upon the side of the utensil so as to hold the device in different positions, whereby to support the lid at different elevations as may be required. The support preferably consists of a strip of spring metal which is folded upon itself, the end portions forming jaws 3 which are brought together and normally touch for some distance, as indicated most clearly in Figure 2, whereby to grip opposite sides of the utensil in a manner to retain the device in adjusted position against displacement. The terminals of the jaws 3 flare as indicated at 4, to facilitate the application of the device to the utensil when placing it in position. The members or legs of the spring clip are spaced apart adjacent the fold, as indicated at 5, whereby provision is had for clearing the rib or usual reinforcement at the upper edge of the pot, as indicated most clearly in Figure 1.

A hook 6 projects from the inner member or leg of the clip adjacent the fold and provides means for positively engaging the marginal portion of the lid or cover 2, whereby to prevent displacement thereof when the lid is tilted, to provide an escape for the steam when the utensil is in service for cooking food. The hook 6 may also serve as a grip and as means for suspending the device from a rack or other support.

When the device is required to hold the lid of a pot or other utensil in elevated position it is engaged with a side of the utensil by applying the flared terminals 4 of the clip to the upper edge of the pot and exerting a downward pressure upon the clip which causes the jaws 3 to spread and pass upon opposite sides of the wall of the utensil, the jaws 3 serving to grip the wall with sufficient pressure to retain the clip in the desired adjusted position. The lid or cover 2 is tilted and an edge portion is engaged with the hook 6 substantially as indicated in Figure 1, thereby supporting the lid in elevated position to provide an escape for the steam and prevent the contents from boiling over. The hook 6 is preferably the width of the metal strip from which the clip is formed. It should be noted that since the arms or legs of the clip are spaced for approximately one-half its length and then have face to face engagement with each other for approximately the remainder of its length the clip may have firm gripping engagement with the wall of the kettle as shown in Fig. 1 and may be slid vertically so that the lid 2 may be supported with its raised side spaced from the kettle a desired distance.

Having thus described the invention, I claim:

1. A lid support for a cooking utensil, the same comprising an elongated spring strip folded intermediate its length to provide jaws normally in contact for some distance from their free ends whereby to obtain an extended grip against the sides of the utensil and having the portions adjacent the fold spaced apart for some distance to provide clearance for the rib or reinforcement at the upper edge of the utensil and permit vertical adjustment of the support upon the utensil, and an abutment projecting laterally from one jaw adjacent the fold to engage and support the lid at the required distance above the utensil.

2. A new article of manufacture consisting of an elongated strip of spring metal folded upon itself to provide jaws connected at their upper ends and having their free lower end portions brought together and the extremities flared, the connected upper end portions being spaced apart a distance sufficient to permit vertical adjustment of the device when in use, and a hook projecting laterally from one of the members adjacent the fold and provided with an upturned bill.

In testimony whereof I affix my signature.

ELIZABETH HAINES. [L. S.]